(12) United States Patent
Feng et al.

(10) Patent No.: US 12,098,502 B2
(45) Date of Patent: Sep. 24, 2024

(54) THERMOPLASTIC ARTIFICIAL LEATHER, METHOD FOR MANUFACTURING THE SAME AND THERMOPLASTIC COMPOSITE LAMINATE

(71) Applicant: San Fang Chemical Industry Co., Ltd., Kaohsiung (TW)

(72) Inventors: Chung-Chih Feng, Kaohsiung (TW); Chih-Yi Lin, Kaohsiung (TW); Kao-Lung Yang, Kaohsiung (TW); Chi-Chin Chiang, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 990 days.

(21) Appl. No.: 16/941,041

(22) Filed: Jul. 28, 2020

(65) Prior Publication Data
US 2020/0354887 A1    Nov. 12, 2020

Related U.S. Application Data

(62) Division of application No. 14/828,901, filed on Aug. 18, 2015, now abandoned.

(30) Foreign Application Priority Data

Mar. 18, 2015   (TW) .................................. 104108560

(51) Int. Cl.
*D06N 3/00*    (2006.01)
*B29C 48/07*   (2019.01)
(Continued)

(52) U.S. Cl.
CPC ........... *D06N 3/0043* (2013.01); *B29C 48/07* (2019.02); *B29C 48/154* (2019.02); *B29C 48/21* (2019.02);
(Continued)

(58) Field of Classification Search
CPC .... D06N 3/0043; D06N 3/005; D06N 3/0088; D06N 3/106; D06N 3/18; D06N 3/183;
(Continued)

(56) References Cited

U.S. PATENT DOCUMENTS

2004/0038018 A1* 2/2004 Anderson ........... B29C 48/0012
    264/50
2010/0247895 A1* 9/2010 Uemura .................. B32B 27/18
    156/331.7
(Continued)

FOREIGN PATENT DOCUMENTS

EP           0027708 A1 *  4/1981
TW         201410470 A  *  3/2014 ........... D06N 3/0036

*Primary Examiner* — John L Goff, II
(74) *Attorney, Agent, or Firm* — WPAT, P.C

(57) ABSTRACT

A thermoplastic artificial leather includes a thermoplastic composite laminate and a textile base. The thermoplastic composite laminate includes a foamed thermoplastic elastic layer, an unfoamed thermoplastic elastic layer and a thermoplastic adhesive layer. The foamed thermoplastic elastic layer has a first surface, a second surface and a plurality of foamed structures. The second surface is opposite to the first surface. The unfoamed thermoplastic elastic layer is disposed on the first surface of the foamed thermoplastic elastic layer. The thermoplastic adhesive layer is disposed on the second surface of the foamed thermoplastic elastic layer. The textile base is laminated on the thermoplastic adhesive layer of the thermoplastic composite laminate.

4 Claims, 7 Drawing Sheets

(51) Int. Cl.
   *B29C 48/154*    (2019.01)
   *B29C 48/21*     (2019.01)
   *B29C 48/37*     (2019.01)
   *B29C 48/375*    (2019.01)
   *B29C 48/49*     (2019.01)
   *B29C 48/88*     (2019.01)
   *B29C 48/92*     (2019.01)
   *B32B 5/02*      (2006.01)
   *B32B 5/18*      (2006.01)
   *B32B 5/24*      (2006.01)
   *B32B 7/12*      (2006.01)
   *B32B 27/06*     (2006.01)
   *B32B 27/32*     (2006.01)
   *B32B 27/36*     (2006.01)
   *B32B 27/40*     (2006.01)
   *B32B 33/00*     (2006.01)
   *D06N 3/10*      (2006.01)
   *D06N 3/14*      (2006.01)
   *B32B 37/12*     (2006.01)

(52) U.S. Cl.
   CPC ............ *B29C 48/37* (2019.02); *B29C 48/387* (2019.02); *B29C 48/49* (2019.02); *B29C 48/914* (2019.02); *B29C 48/92* (2019.02); *B32B 5/022* (2013.01); *B32B 5/024* (2013.01); *B32B 5/18* (2013.01); *B32B 5/245* (2013.01); *B32B 7/12* (2013.01); *B32B 27/065* (2013.01); *B32B 27/32* (2013.01); *B32B 27/36* (2013.01); *B32B 27/40* (2013.01); *B32B 33/00* (2013.01); *D06N 3/0006* (2013.01); *D06N 3/0011* (2013.01); *D06N 3/106* (2013.01); *D06N 3/14* (2013.01); *B29C 2948/92704* (2019.02); *B32B 2037/1215* (2013.01); *B32B 2262/0276* (2013.01); *B32B 2266/02* (2013.01); *B32B 2266/025* (2013.01); *B32B 2266/0264* (2013.01); *B32B 2266/0278* (2013.01); *B32B 2274/00* (2013.01); *B32B 2305/188* (2013.01); *B32B 2305/20* (2013.01); *B32B 2307/51* (2013.01); *B32B 2307/536* (2013.01); *B32B 2307/732* (2013.01); *D06N 2213/03* (2013.01)

(58) Field of Classification Search
   CPC .. D06N 2213/03; B29C 48/07; B29C 48/154; B29C 48/21; B29C 48/37; B29C 48/387; B29C 48/49; B29C 48/914; B29C 48/92; B29C 48/0012; B29C 48/0021; B29C 48/16; B29C 2948/92704; B32B 2037/1215; B32B 2305/188; B32B 2305/20; B32B 2038/0084
   USPC ...................................... 156/78, 79
   See application file for complete search history.

(56) References Cited

U.S. PATENT DOCUMENTS

2014/0079943 A1* 3/2014 Feng .................. D06N 3/0045
                                                    156/80
2014/0316053 A1* 10/2014 Park ...................... C08G 18/44
                                                    524/537

* cited by examiner

THERMOPLASTIC ARTIFICIAL LEATHER, METHOD FOR MANUFACTURING THE SAME AND THERMOPLASTIC COMPOSITE LAMINATE

FIELD

The disclosure relates to an artificial leather and a laminate, more particular to a thermoplastic artificial leather, a method for manufacturing the thermoplastic artificial leather and a thermoplastic composite laminate.

BACKGROUND

In conventional processes for manufacturing artificial leather, no matter a dry coating process or a wet coating process, an organic solvent (for example, DMF) is used. Although the organic solvent can be recycled, establishment costs of a recycling equipment are quite high and it is considerably difficult to fully recycle. Therefore, it is difficult to achieve zero tolerance of the organic solvent, thus not conforming to environment protection requirements. Furthermore, the touch feeling and abrasion resistance (stoll abrasion=1500−; testing method: NIKE G12) of the artificial leather made by the conventional processes are generally poor.

The conventional artificial leather and manufacturing method thereof are analyzed in the following patent documents in the prior art.

1. TW I409375

Approach: A thermoplastic film is used and laminated on modified cross-section fibers, and then processed to obtain a leather.

Disadvantage: There is no foamed structure, the leather is too hard, and the touch feeling is poor.

2. TW I290568

Approach: A thermoplastic film is used for secondary processing of the surface to cover a foamed layer, so as to obtain a leather.

Disadvantage: The process efficiency of secondary processing of the surface layer is poor.

3. TW 442392

Approach: A thermoplastic film is used and laminated on a fabric to obtain a leather.

Disadvantage: There is no foamed structure, the leather is too hard, and the touch feeling is poor.

Based on the foregoing analysis, it is necessary to provide a thermoplastic artificial leather and a method for manufacturing the thermoplastic artificial leather as well as thermoplastic composite laminate, so as to solve the foregoing deficiencies in the prior art.

SUMMARY OF THE INVENTION

In accordance with one aspect of the present disclosure, a thermoplastic artificial leather includes a thermoplastic composite laminate and a textile base. The thermoplastic composite laminate includes a foamed thermoplastic elastic layer, an unfoamed thermoplastic elastic layer and a thermoplastic adhesive layer. The foamed thermoplastic elastic layer has a first surface, a second surface and a plurality of foamed structures. The second surface is opposite to the first surface. The unfoamed thermoplastic elastic layer is disposed on the first surface of the foamed thermoplastic elastic layer. The thermoplastic adhesive layer is disposed on the second surface of the foamed thermoplastic elastic layer. The textile base is laminated on the thermoplastic adhesive layer of the thermoplastic composite laminate.

In accordance with another aspect of the present disclosure, a method for manufacturing a thermoplastic artificial leather includes step in which a thermoplastic composite laminate is prepared, wherein the thermoplastic composite laminate includes a foamed thermoplastic elastic layer, an unfoamed thermoplastic elastic layer and a thermoplastic adhesive layer, the foamed thermoplastic elastic layer has a first surface, a second surface opposite to the first surface and a plurality of foamed structures, the unfoamed thermoplastic elastic layer is disposed on the first surface of the foamed thermoplastic elastic layer, and the thermoplastic adhesive layer is disposed on the second surface of the foamed thermoplastic elastic layer. The method continues with step in which a textile base is laminated on the thermoplastic adhesive layer of the thermoplastic composite laminate.

In accordance with another aspect of the present disclosure, a thermoplastic composite laminate includes a foamed thermoplastic elastic layer, an unfoamed thermoplastic elastic layer and a thermoplastic adhesive layer. The foamed thermoplastic elastic layer has a first surface, a second surface and a plurality of foamed structures. The second surface is opposite to the first surface. The unfoamed thermoplastic elastic layer is disposed on the first surface of the foamed thermoplastic elastic layer. The thermoplastic adhesive layer is disposed on the second surface of the foamed thermoplastic elastic layer.

In accordance with another aspect of the present disclosure, a thermoplastic composite laminate includes a foamed thermoplastic elastic layer and an unfoamed thermoplastic elastic layer. The foamed thermoplastic elastic layer has a first surface, a second surface and a plurality of foamed structures. The second surface is opposite to the first surface. The unfoamed thermoplastic elastic layer is disposed on the first surface of the foamed thermoplastic elastic layer.

In accordance with another aspect of the present disclosure, a thermoplastic composite laminate includes a foamed thermoplastic elastic layer and a thermoplastic adhesive layer. The foamed thermoplastic elastic layer has a first surface, a second surface and a plurality of foamed structures. The second surface is opposite to the first surface. The thermoplastic adhesive layer is disposed on the second surface of the foamed thermoplastic elastic layer.

In the present disclosure, a three-layer composite structure consisting of a foamed thermoplastic elastic layer, an unfoamed thermoplastic elastic layer and a thermoplastic adhesive layer, a two-layer composite structure consisting of a foamed thermoplastic elastic layer and an unfoamed thermoplastic elastic layer, or a two-layer composite structure consisting of a foamed thermoplastic elastic layer and a thermoplastic adhesive layer can separately be used to form a thermoplastic composite laminate; and by laminating a textile base on the thermoplastic composite laminate, a thermoplastic artificial leather with good abrasion resistance (stoll abrasion=3000+; testing method: NIKE G12), a peeling strength of greater than 4.0 kg/cm$^2$ and a soft touch feeling can be manufactured. Furthermore, the thermoplastic artificial leather can be manufactured without use of any solvent, so as to conform to the environment protection requirement.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
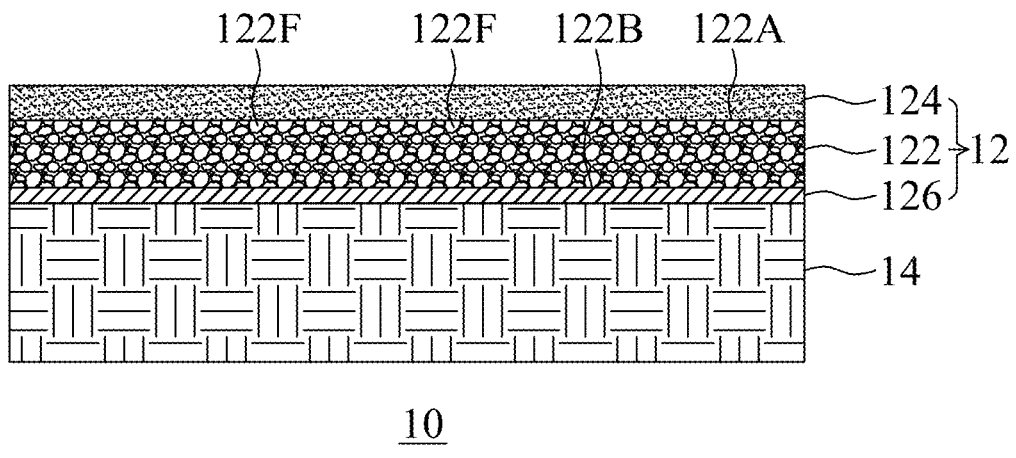
FIG. 1 shows a schematic structural view of a thermoplastic artificial leather according to the present disclosure.

It is to be understood that the following disclosure provides many different embodiments or examples, for implementing different features of various embodiments. Specific examples of components and arrangements are described is below to simplify the present disclosure. The present disclosure may, however, be embodied in many different forms and should not be construed as being limited to the embodiments set forth herein; rather, these embodiments are provided so that this description will be thorough and complete, and will fully convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Referring to FIG. 1, which shows a schematic structural view of a thermoplastic artificial leather according to the present disclosure. The thermoplastic artificial leather 10 of the present disclosure includes a thermoplastic composite laminate 12 and a textile base 14.

The thermoplastic composite laminate 12 includes a foamed thermoplastic elastic layer 122, an unfoamed thermoplastic elastic layer 124 and a thermoplastic adhesive layer 126.

The foamed thermoplastic elastic layer 122 has a first surface 122A, a second surface 122B and a plurality of foamed structures 122F. The second surface 122B is opposite to the first surface 122A. In some embodiments, the material of the foamed thermoplastic elastic layer 122 can be a thermoplastic polyurethane (TPU), a thermoplastic polyester elastomer (TPEE) or a thermoplastic polyolefin (TPO) elastomer, and preferably, the foamed thermoplastic elastic layer 122 has a Shore hardness of 50A to 85A inclusive.

Additionally, in order to enable the foamed thermoplastic elastic layer 122 to provide the feeling of thick resilient leather, preferably, the foamed thermoplastic elastic layer 122 should have a foaming density reduction rate (density after foaming/density before foaming) of 40% to 90% inclusive, and the foamed structures 122F should have a size of 20 to 300 microns inclusive.

The unfoamed thermoplastic elastic layer 124 is disposed on the first surface 122A of the foamed thermoplastic elastic layer 122. In some embodiments, the material of the unfoamed thermoplastic elastic layer 124 can be a thermoplastic polyurethane (TPU), a thermoplastic polyester elastomer (TPEE) or a thermoplastic polyolefin (TPO) elastomer, and preferably, the unfoamed thermoplastic elastic layer 124 has a Shore hardness of 60A to 80A inclusive.

Furthermore, in order to improve the thick feel and the leather touch feeling of the thermoplastic artificial leather 10, the thickness ratio of the unfoamed thermoplastic elastic layer 124 to the foamed thermoplastic elastic layer 122 is preferably 95:5 to 5:95 inclusive.

The thermoplastic adhesive layer 126 is disposed on the second surface 122B of the foamed thermoplastic elastic layer 122. In some embodiments, the thermoplastic adhesive layer 126 is a hot-melt adhesive layer, and the material of the thermoplastic adhesive layer 126 can be a thermoplastic polyurethane (TPU), a thermoplastic polyester elastomer (TPEE), a thermoplastic polyolefin (TPO) elastomer, or a water-based paste. Additionally, if the thermoplastic adhesive layer 126 uses TPU, TPEE or TPO, the thermoplastic adhesive layer 126 preferably has a Shore hardness of 60A to 90A inclusive.

The textile base 14 is laminated on the thermoplastic adhesive layer 126 of the thermoplastic composite laminate 12. In some embodiments, the textile base 14 can be a nonwoven fabric or a woven fabric.

Figure 2:
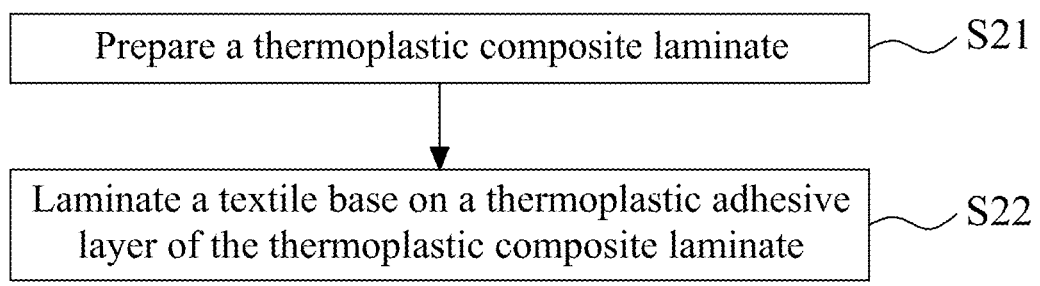
FIG. 2 is a flow diagram of a method for manufacturing a thermoplastic artificial leather according to the present disclosure.
Figure 3A:
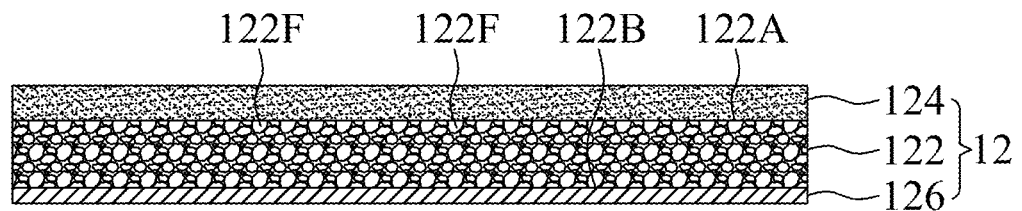
FIGS. 3A and 3B show schematic diagrams of a method for manufacturing a thermoplastic artificial leather according to the present disclosure.
Figure 3B:
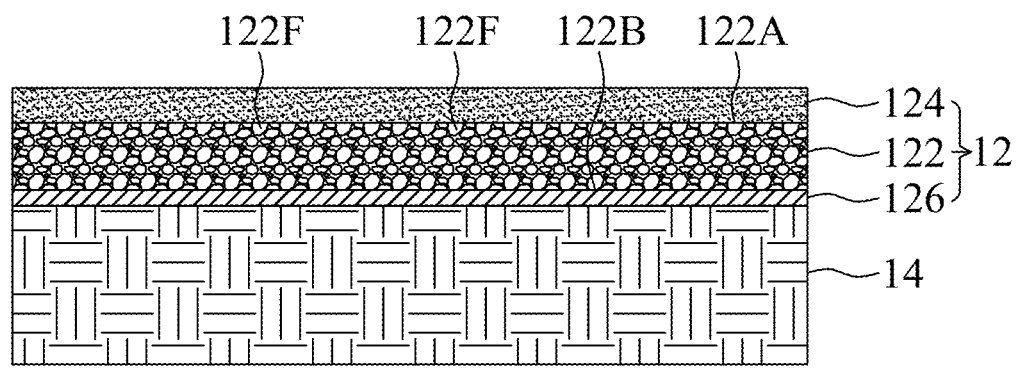

FIG. 2 is a flow diagram of a method for manufacturing a thermoplastic artificial leather according to the present disclosure. FIGS. 3A and 3B show schematic diagrams of a method for manufacturing a thermoplastic artificial leather according to the present disclosure.

With reference to step S21 in FIG. 2 and FIG. 3A, a thermoplastic composite laminate 12 is prepared. In this step, the thermoplastic composite laminate 12 includes a foamed thermoplastic elastic layer 122, an unfoamed thermoplastic elastic layer 124 and a thermoplastic adhesive layer 126. The foamed thermoplastic elastic layer 122 has a first surface 122A, a second surface 122B and a plurality of foamed structures 122F, and the second surface 122B is opposite to the first surface 122A. The unfoamed thermoplastic elastic layer 124 is disposed on the first surface 122A of the foamed thermoplastic elastic layer 122. The thermoplastic adhesive layer 126 is disposed on the second surface 122B of the foamed thermoplastic elastic layer 122.

Figure 4:
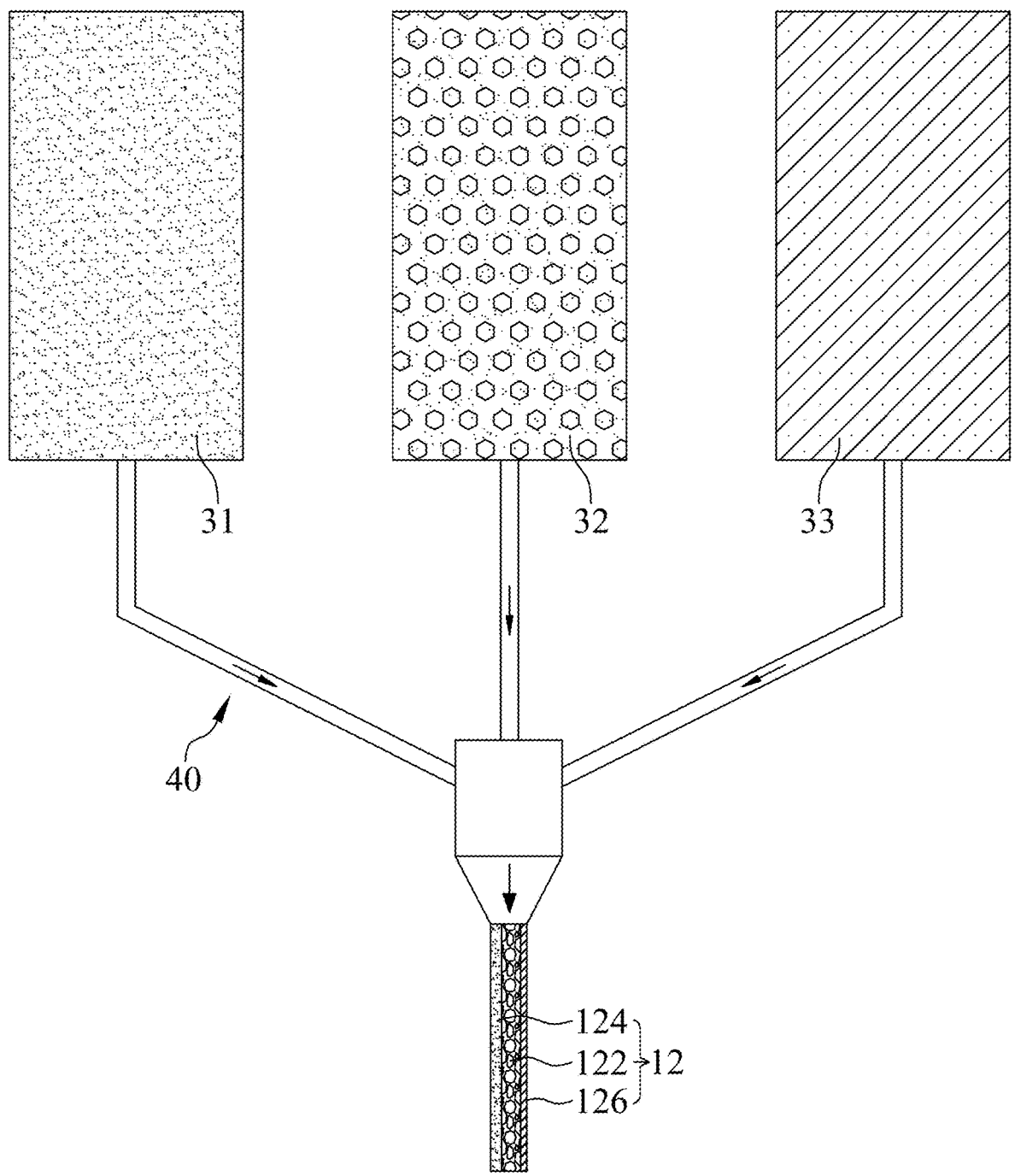
FIG. 4 shows a schematic view of a process for preparing a thermoplastic composite laminate according to the present disclosure.

Referring to FIG. 4, which shows a schematic view of a process for preparing a thermoplastic composite laminate according to the present disclosure. In some embodiments, the method for preparing the thermoplastic composite laminate 12 includes:

Step 1: Provide a first raw material 31, a second raw material 32 and a third raw material 33, wherein the first raw material 31 is used to prepare the unfoamed thermoplastic elastic layer 124, the second raw material 32 is used to prepare the foamed thermoplastic elastic layer 122, and the third raw material 33 is used to prepare the thermoplastic adhesive layer 126. In this step, the first raw material 31, the second raw material 32 and the third raw material 33 can be a thermoplastic polyurethane (TPU), a thermoplastic polyester elastomer (TPEE), or a thermoplastic polyolefin (TPO) elastomer. Preferably, the first raw material 31 has a melting point of 140° C. to 165° C. inclusive, the second raw material 32 has a melting point of 135° C. to 150° C. inclusive, and the third raw material 33 has a melting point of 90° C. to 133° C. inclusive. Additionally, in order to make the first raw material 31, the second raw material 32 and the third raw material 33 all have a moisture content of less than 300 ppm, the first raw material 31, the second raw material 32 and the third raw material 33 can be processed by drying.

Step 2: Use an extruding apparatus 40 to melt and then co-extrude the first raw material 31, the second raw material 32 and the third raw material 33, to form the thermoplastic composite laminate 12. In this step, the second raw material 32 can be processed by foaming, such that the foamed thermoplastic elastic layer 122 can be prepared with the second raw material 32. Preferably, the foaming method is selected from the group consisting of microsphere foaming, nitrogen foaming, carbon dioxide foaming and supercritical carbon dioxide foaming.

Figure 5:
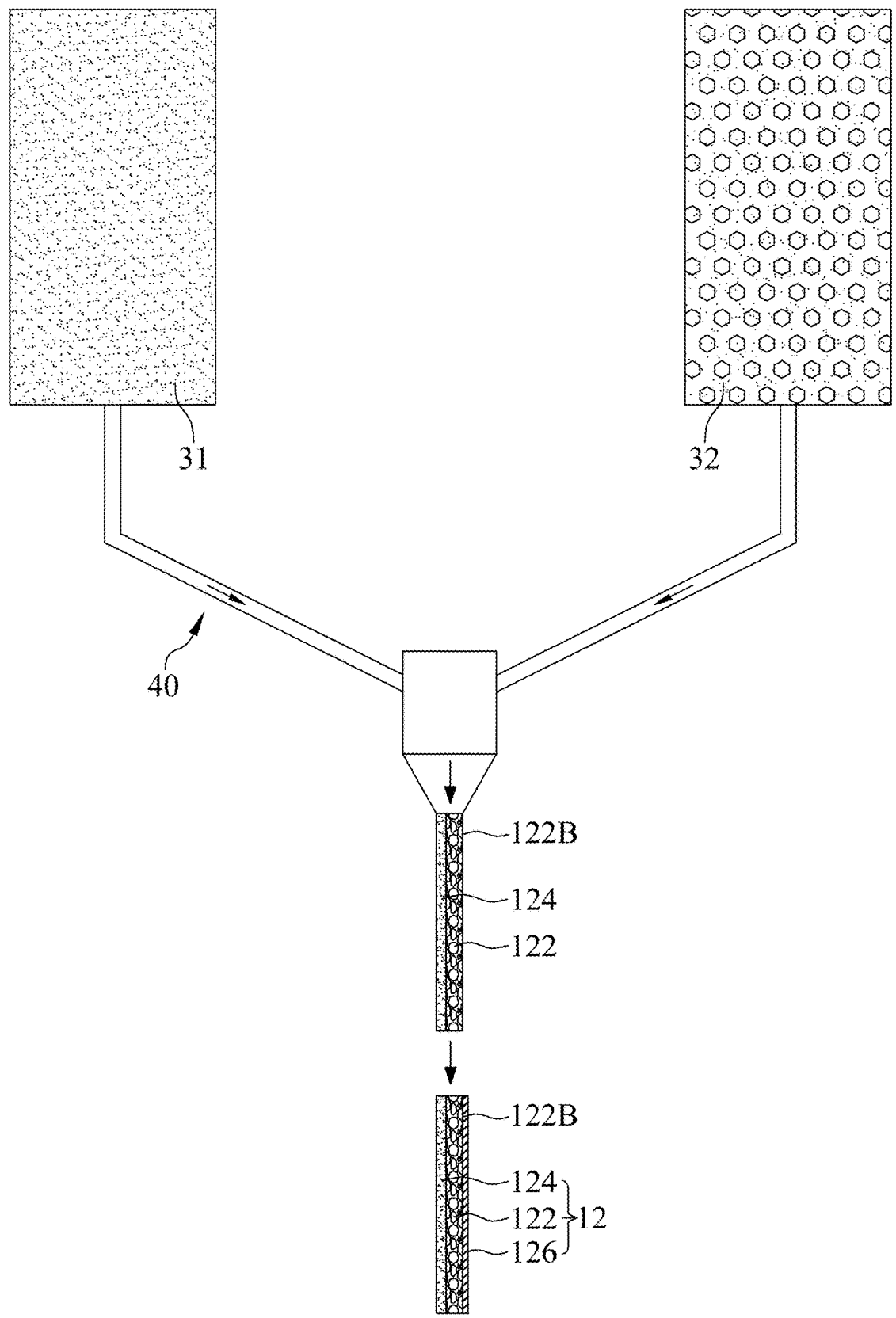
FIG. 5 shows a schematic view of another process for preparing a thermoplastic composite laminate according to the present disclosure.

Referring to FIG. 5, which shows a schematic view of another process for preparing a thermoplastic composite laminate according to the present disclosure. In some embodiments, the method for preparing the thermoplastic composite laminate 12 can include:

Step 1: Provide a first raw material 31 and a second raw material 32, wherein the first raw material 31 is used to prepare the unfoamed thermoplastic elastic layer 124, and the second raw material 32 is used to prepare the foamed thermoplastic elastic layer 122. In this step, the first raw material 31 and the second raw material 32 can be a thermoplastic polyurethane (TPU), a thermoplastic polyester elastomer (TPEE), or a thermoplastic polyolefin (TPO) elastomer. Preferably, the first raw material 31 has a melting point of 140° C. to 165° C. inclusive, and the second raw material 32 has a melting point of 135° C. to 150° C. inclusive. Additionally, in order to make the first raw material 31 and the second raw material 32 both have a moisture content of less than 300 ppm, the first raw material 31 and the second raw material 32 can be processed by drying.

Step 2: Use an extruding apparatus 40 to melt and then co-extrude the is first raw material 31 and the second raw material 32, to form the unfoamed thermoplastic elastic layer 124 and the foamed thermoplastic elastic layer 122. In this step, the second raw material 32 can be processed by foaming, such that the foamed thermoplastic elastic layer 122 can be prepared with the second raw material 32. Preferably, the foaming method is selected from the group consisting of microsphere foaming, nitrogen foaming, carbon dioxide foaming and supercritical carbon dioxide foaming.

Step 3: Dispose a thermoplastic adhesive layer 126 on the second surface 122B of the foamed thermoplastic elastic layer 122, thus obtaining the thermoplastic composite laminate 12. In this step, the thermoplastic adhesive layer 126 is a hot-melt adhesive layer, and the material of the thermoplastic adhesive layer 126 can be a thermoplastic polyurethane (TPU), a thermoplastic polyester elastomer (TPEE), a thermoplastic polyolefin (TPO) elastomer, or a water-based paste. Furthermore, the thermoplastic adhesive layer 126 preferably has a moisture content of less than 300 ppm.

With reference to step S22 in FIG. 2 and FIG. 3B, a textile base 14 is laminated on the thermoplastic adhesive layer 126 of the thermoplastic composite laminate 12. In this step, the textile base 14 can be a nonwoven fabric or a woven fabric.

Figure 6:
FIG. 6 is an optical microscopic photograph of a cross-section of a thermoplastic artificial leather according to the present disclosure.

FIG. 6 is an optical microscopic photograph of a cross-section of a thermoplastic artificial leather according to the present disclosure.

As shown in FIG. 6, the present disclosure uses the foamed thermoplastic elastic layer 122, the unfoamed thermoplastic elastic layer 124 and the thermoplastic adhesive layer 126 to form the thermoplastic composite laminate 12; and by laminating the textile base 14 on the thermoplastic composite laminate 12, a thermoplastic artificial leather with good abrasion resistance (stoll abrasion=3000+; testing method: NIKE G12), a peeling strength of greater than 4.0 kg/cm$^2$ and a soft touch feeling can be manufactured. Furthermore, the thermoplastic artificial leather can be manufactured without use of any solvent, so as to conform to the environment is protection requirement.

Figure 7:
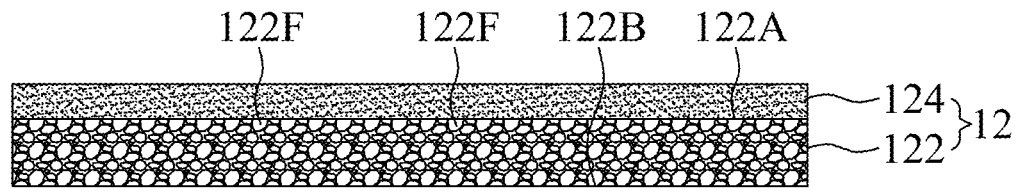
FIG. 7 is another schematic structural view of a thermoplastic composite laminate according to the present disclosure.
Figure 8:
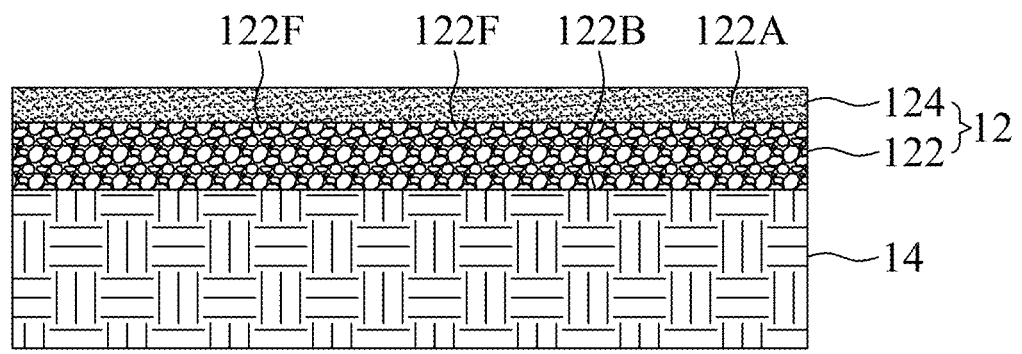
FIG. 8 is another schematic structural view of a thermoplastic artificial leather according to the present disclosure.

FIG. 7 is another schematic structural view of a thermoplastic composite laminate according to the present disclosure. FIG. 8 is another schematic structural view of a thermoplastic artificial leather according to the present disclosure.

Besides the three-layer composite structure consisting of the foamed thermoplastic elastic layer 122, the unfoamed thermoplastic elastic layer 124 and the thermoplastic adhesive layer 126 as shown in FIG. 1, in another embodiment, as shown in FIGS. 7 and 8, the thermoplastic composite laminate 12 can be a two-layer composite structure consisting of the foamed thermoplastic elastic layer 122 and the unfoamed thermoplastic elastic layer 124. The unfoamed thermoplastic elastic layer 124 is disposed on a first surface 122A of the foamed thermoplastic elastic layer 122, and the textile base 14 can be laminated on the foamed thermoplastic elastic layer 122 of the thermoplastic composite laminate 12, thus obtaining the thermoplastic artificial leather 10.

Figure 9:
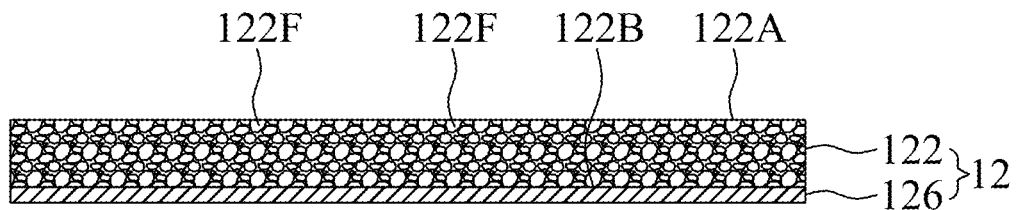
FIG. 9 is a further schematic structural view of a thermoplastic composite laminate according to the present disclosure.
Figure 10:
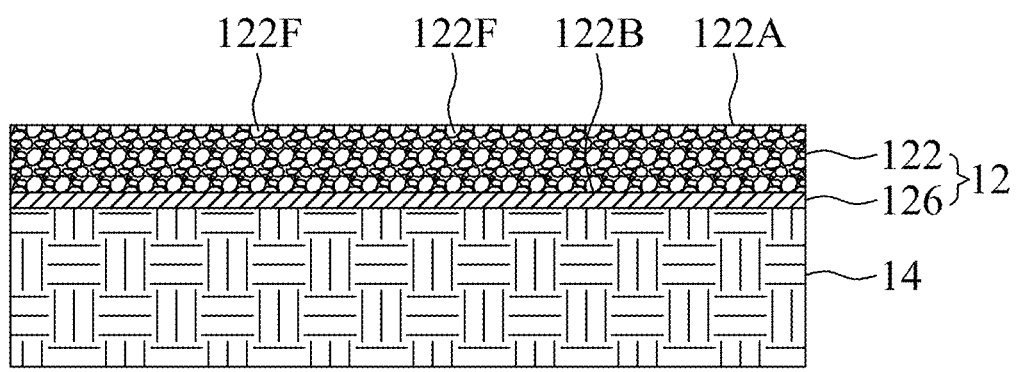
FIG. 10 is a further schematic structural view of a thermoplastic artificial leather according to the present disclosure.

FIG. 9 is a further schematic structural view of a thermoplastic composite laminate according to the present disclosure. FIG. 10 is a further schematic structural view of a thermoplastic artificial leather according to the present disclosure.

Besides the three-layer composite structure consisting of the foamed thermoplastic elastic layer 122, the unfoamed thermoplastic elastic layer 124 and the thermoplastic adhesive layer 126 as shown in FIG. 1, in yet another embodiment, as shown in FIGS. 9 and 10, the thermoplastic composite laminate 12 can be a two-layer composite structure consisting of the foamed thermoplastic elastic layer 122 and the thermoplastic adhesive layer 126. The thermoplastic adhesive layer 126 is disposed on a second surface 122B of the foamed thermoplastic elastic layer 122, and the textile base 14 can be laminated on the thermoplastic adhesive layer 126 of the thermoplastic composite laminate 12, thus obtaining the thermoplastic artificial leather 10.

The present disclosure is illustrated in detail with the following embodiments, but it does not mean that the present disclosure is only limited to the is content disclosed by these embodiments.

Embodiment 1

Raw material: Thermoplastic polyurethane (TPU) is used as a first raw material and a second raw material, and processed by drying, to make the moisture content of TPU less than 300 ppm.

Temperature setting conditions: The temperatures set for a first raw material extruder are respectively 100° C., 150° C. and 185° C. in sequence; the temperatures set for a second raw material extruder are respectively 80° C., 145° C. and 170° C. in sequence, and microsphere foaming functional EVA beads (0.5% to 3.5%) from SEKISUI (Japan) are added; the temperature of a T-die mold is 180° C.

Thickness setting: Gear pumps of the first raw material and the second raw material are respectively adjusted to control the thickness ratio of an unfoamed TPU layer to a TPU foaming layer to 1:3.

Through cooling by a chilling roller at a controlled speed of 3.5 m/min to form a film, a TPU composite layer with a total thickness of about 0.4 mm can be manufactured, wherein the unfoamed TPU layer is 0.1 mm thick, and the TPU foaming layer is 0.3 mm thick.

On a surface of the above TPU composite layer, a water-based PU is processed using a PU dry laminating machine for surface modification.

A 0.1 mm thick TPU hot-melt adhesive layer is disposed between the TPU composite layer and a polyester melt-blown nonwoven fabric, and the polyester melt-blown nonwoven fabric (weight: 300 g/m$^2$) is laminated on the TPU composite layer through a roller laminating machine under a condition that the roller surface temperature is 120° C., thus obtaining an environmental-friendly TPU artificial leather.

Embodiment 2

Raw material: Thermoplastic polyurethane (TPU) is used as a first raw material, a second raw material and a third raw material, and processed by drying, to make the moisture content of TPU less than 300 ppm.

Temperature setting conditions: The temperatures set for a first raw material extruder are respectively 100° C., 150° C. and 185° C. in sequence; the temperatures set for a second raw material extruder are respectively 80° C., 145° C. and 170° C. in sequence, and microsphere foaming functional EVA beads (2% to 4%) from SEKISUI (Japan) are added; the temperatures set for a third raw material extruder are respectively 80° C., 120° C. and 160° C. in sequence; the temperature of a T-die mold is 180° C.

Thickness setting: Gear pumps of the first raw material, the second raw material and the third raw material are respectively adjusted to control the thickness ratio of an unfoamed TPU layer, a TPU foaming layer and a TPU hot-melt adhesive layer to 1:3.5:1.5.

Through cooling by a chilling roller at a controlled speed of 2.8 m/min to form a film, a TPU composite laminate with a total thickness of about 0.6 mm can be manufactured, wherein the unfoamed TPU layer is 0.1 mm thick, the TPU foaming layer is 0.35 mm thick, and the TPU hot-melt adhesive layer is 0.15 mm thick.

On a surface of the above TPU composite laminate, a water-based PU is processed for surface modification.

A polyester needle-punched nonwoven fabric (thickness: 0.7 mm) is laminated on the TPU composite laminate through a roller laminating machine under a condition that the roller surface temperature is 120° C., thus obtaining an environmental-friendly TPU artificial leather.

Embodiment 3

Raw material: Thermoplastic polyurethane (TPU) is used as a first raw material, a second raw material and a third raw material, and processed by drying, to make the moisture content of TPU less than 300 ppm.

Temperature setting conditions: The temperatures set for a first raw material extruder are respectively 100° C., 150° C. and 185° C. in sequence; the temperatures set for a second raw material extruder are respectively 80° C., 145° C. and 170° C. in sequence, and a supercritical carbon dioxide with a condition of 200° C/80 bar is introduced through a pipeline; the temperatures set for a third raw material extruder are respectively 80° C., 120° C. and 160° C. in sequence; the temperature of a T-die mold is 160° C., and the pressure is controlled at 50 to 60 bar.

Thickness setting: Gear pumps of the first raw material, the second raw material and the third raw material are respectively adjusted to control the thickness ratio of an unfoamed TPU layer, a TPU foaming layer and a TPU hot-melt adhesive layer to 1:3.5:1.5.

Through cooling by a chilling roller at a controlled speed of 2.8 m/min to form a film, a TPU composite laminate with a total thickness of about 0.6 mm can be manufactured, wherein the unfoamed TPU layer is 0.1 mm thick, the TPU foaming layer is 0.35 mm thick, and the TPU hot-melt adhesive layer is 0.15 mm thick.

On a surface of the above TPU composite laminate, a water-based PU is processed using a PU dry laminating machine for surface modification.

A polyester woven fabric (warp densities: 175 F/inch and weft densities: 100 F/inch) is laminated on the TPU composite laminate through a roller laminating machine under a condition that the roller surface temperature is 120° C., thus obtaining an environmental-friendly TPU artificial leather.

Embodiment 4

Raw material: Thermoplastic polyurethane (TPU) is used as a first raw material and a second raw material, and processed by drying, to make the moisture content of TPU less than 300 ppm.

Temperature setting conditions: The temperatures set for a first raw material extruder are respectively 100° C., 150° C. and 185° C. in sequence; the temperatures set for a second raw material extruder are respectively 80° C., 145° C. and 170° C. in sequence, and microsphere foaming functional EVA beads (0.5% to 3.5%) from SEKISUI (Japan) are added; the temperature of a T-die mold is 180° C.

Thickness setting: Gear pumps of the first raw material and the second raw material are respectively adjusted to control the thickness ratio of an unfoamed TPU layer to a TPU foaming layer to 1:3.

Through cooling by a chilling roller at a controlled speed of 3.5 m/min to form a film, a TPU composite layer with a total thickness of about 0.4 mm can be manufactured, wherein the unfoamed TPU layer is 0.1 mm thick, and the TPU foaming layer is 0.3 mm thick.

For the above TPU composite layer, a PU dry laminating machine is used for surface modification of the PU surface.

A water-based paste is applied between the TPU composite layer and a polyester woven fabric (warp densities: 175 F/inch and weft densities: 100 F/inch), and the polyester woven fabric is laminated on the TPU composite layer through a dry laminating machine, thus obtaining an environmental-friendly TPU artificial leather.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the invention.

What is claimed is:

1. A method for manufacturing a thermoplastic artificial leather, comprising:
    (a) preparing a thermoplastic composite laminate, wherein the thermoplastic composite laminate includes a foamed thermoplastic elastic layer, an unfoamed thermoplastic elastic layer and a thermoplastic adhesive layer, the foamed thermoplastic elastic layer has a first surface, a second surface opposite to the first surface and a plurality of foamed structures, the unfoamed thermoplastic elastic layer is disposed on the first surface of the foamed thermoplastic elastic layer, and the thermoplastic adhesive layer is disposed on the second surface of the foamed thermoplastic elastic layer, wherein the method for preparing the thermoplastic composite laminate includes:
    (a1) providing a first raw material, a second raw material and a third raw material, wherein the first raw material is used to prepare the unfoamed thermoplastic elastic layer, the second raw material is used to prepare the foamed thermoplastic elastic layer, and the third raw material is used to prepare the thermoplastic adhesive layer, wherein a range of a melting point of the first raw material is free of overlapping a range of a melting point of the third raw material, and a range of a melting point of the second raw material is free of overlapping the range of the melting point of the third raw material, wherein a lowest melting point of the first raw material is higher than a lowest melting point of the second raw material, and a highest melting point of the first raw material is higher than a highest melting point of the second raw material; and
    (a2) using an extruding apparatus to melt and then co-extrude the first raw material, the second raw material and the third raw material, to form the thermoplastic composite laminate; and
    (b) laminating a textile base on the thermoplastic adhesive layer of the thermoplastic composite laminate.

2. The method of claim 1, wherein in the step (a1), the first raw material, the second raw material and the third raw material are a thermoplastic polyurethane (TPU), a thermoplastic polyester elastomer (TPEE), or a thermoplastic polyolefin (TPO) elastomer.

3. The method of claim 1, wherein in the step (a2), the second raw material is processed by foaming, and the foaming method is selected from the group consisting of microsphere foaming, nitrogen foaming, carbon dioxide foaming and supercritical carbon dioxide foaming.

4. The method of claim 1, wherein in the step (b), the textile base is a nonwoven fabric or a woven fabric.

* * * * *